March 6, 1956  F. P. RICHTHAMER  2,736,976
PHOTOGRAPH MOUNT

Filed Oct. 18, 1952  2 Sheets-Sheet 1

INVENTOR.
FRANK P. RICHTHAMER
BY
Woodling and Krost

March 6, 1956   F. P. RICHTHAMER   2,736,976
PHOTOGRAPH MOUNT

Filed Oct. 18, 1952   2 Sheets-Sheet 2

INVENTOR.
FRANK P. RICHTHAMER
BY
Woodling and Krost,
attys.

United States Patent Office 2,736,976
Patented Mar. 6, 1956

2,736,976

PHOTOGRAPH MOUNT

Frank P. Richthamer, Cleveland, Ohio, assignor to McMillin-Foley Publishing Company Application October 18, 1952, Serial No. 315,463

12 Claims. (Cl. 40—158)

The invention relates in general to display devices and more particularly to such devices as photograph mounts which may be rotated to two alternative positions. The prior art type of frames or mounts for photographs as used in albums and the like included a type of frame which could be attached to the page of the album in either of two alternative positions. Since photographs are generally rectangular, as opposed to square, the photograph sometimes should be mounted with its long dimension vertically and sometimes should be mounted with its long dimension horizontally depending upon the position of the film when the picture was taken. A square or rectangular photograph mount may thus be used to house or contain the photograph, and this mount may then be attached to the page of the photograph album in either a horizontal or a vertical position. The prior art discloses tabs and slots in the mount and the page of the album to effect this alternative positioning.

To use the prior art tab and slot form of fastening the mount, one must bend the tabs or the mount, and this is liable to crease or permanently deface the mount. Further, if the mount is changed very many times from one alternative position to the other, the tabs may become bent or broken or the mount may become bent with a permanent crease.

An object of the invention, therefore, is to provide a photograph mount which may be attached to a page of a photograph album and which may have two alternative positions 90 degrees apart, with these positions being obtained by rotating the photograph mount rather than removing the mount from the page and reattaching it to the page.

Another object of the invention is to provide a display frame which may be freely rotated relative to the supporting sheet.

Another object of the invention is to provide a photograph mount which is securely attached to the page of a photograph album and cannot be removed.

Still another object of the invention is to provide a photograph mount or the like which may have two alternative positions relative to the supporting page with these positions being obtained by shifting the mounting relative to the page without separating the two.

Another object of the invention is to provide an interlocking connection between a photograph mount and a supporting page which interlocking connection will prevent separation of the mount and the page in a direction normal to the page, yet will permit a partial arcuate movement of the mount relative to the page.

Still another object of the invention is to provide a photograph mount which is a composite structure of pieces of cardboard or the like which has a tongue and groove interlocking connection with an opening in a supporting page which will permit rotation of the mount on the page.

Still another object of the invention is to provide an interlocking connection between a photograph mount or the like and a supporting page which will permit a plurality of angular positions of the mount relative to the page.

Still another object of the invention is to provide an interlocking connection between a photograph mount or the like and a supporting page of a book wherein spacer elements are used to maintain all portions of the mount and page substantially flat and parallel.

Still another object of the invention is to provide a photograph mount for a page of a photograph album wherein the page has a circular opening therein and wherein the photograph mount is a composite structure using a small spacer disc within the circular opening and using a larger disc on one side of the page and the mount on the other side of the page adhesively secured together for a composite structure which will rotate relative to the page and wherein the larger disc is confined within the periphery of the page to substantially eliminate transverse shifting of the mount relative to the page.

Other objects and a fuller understanding of this invention may be had by referring to the following description and claims, taken in conjunction with the accompanying drawings, in which:

Figure 1:
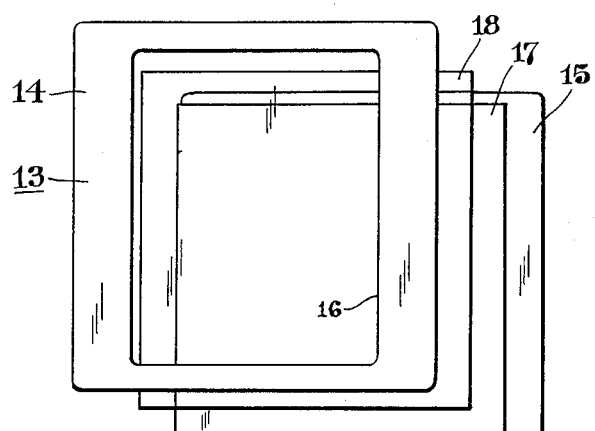
Figure 1 is an exploded view of the parts of a photograph mount.
Figure 9:
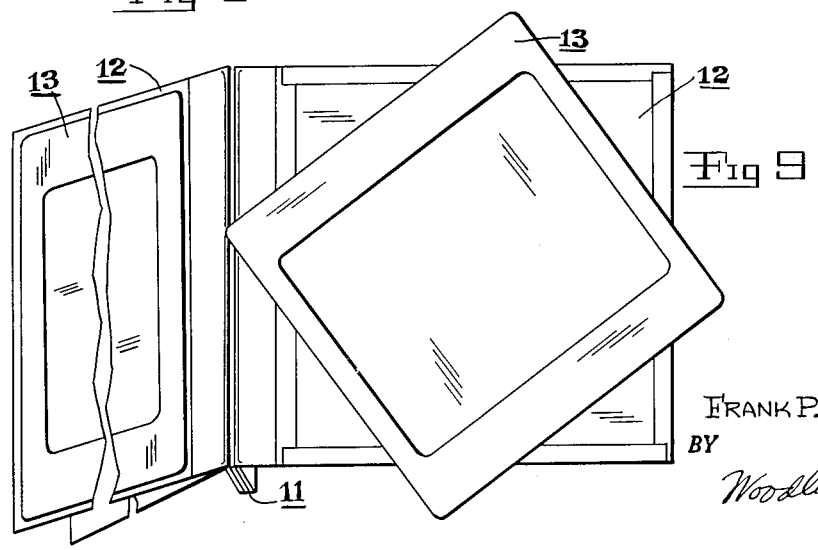
Figure 9 is a view of an open album having the turnable photograph mount at an angle to the page.

The Figure 9 shows the completed preferred embodiment of the invention wherein an album 11 has a plurality of double sided pages 12. The pages 12 are double sided in that they have a photograph mount 13 on each side thereof. The photograph mount 13 is shown in an exploded or partially assembled condition in Figure 1. This photograph mount includes a square front cover 14 and a square rear cover 15. The front cover 14 has a rectangular window opening 16 with the rectangle having proportions designed to effectively display a photograph 17 or the like. A transparent sheet 18 slightly larger than the opening 16 may be used to protect the photograph 17. The front and rear covers 14 and 15 are preferably glued or otherwise secured in a narrow band along three edges thereof. This provides a small flat pocket open at one end so that the photograph 17 and transparent sheet 18 may be inserted. The front and rear covers 14 and 15 may be made from cardboard or similar material.

Figure 3:
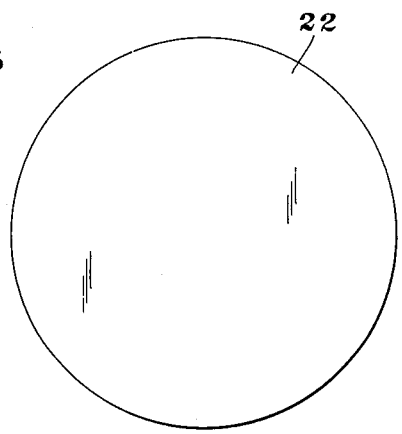
Figure 3 is a plan view of a large centering disc.
Figure 2:
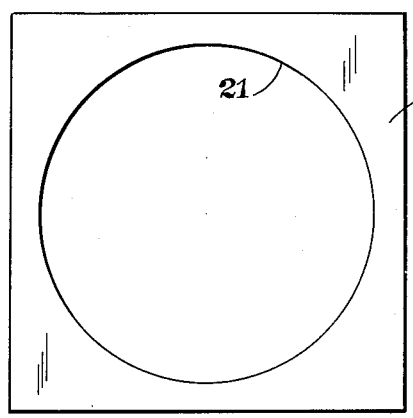
Figure 2 is a plan view of a page for a photograph album.
Figure 4:
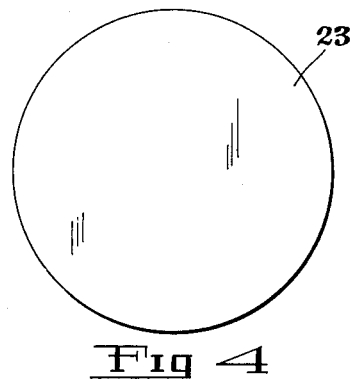
Figure 4 is a plan view of a small spacer disc.
Figure 5:
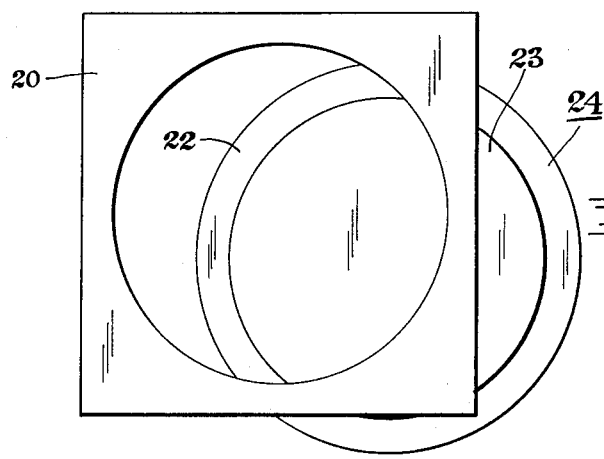
Figure 5 is a plan view showing partial assembly of the discs and page.

The Figure 2 shows a sheet 20 which is square and which has a large circular opening 21 centrally disposed therein. A large disc 22 of cardboard or the like is shown in Figure 3, and a smaller spacer disc 23 also of cardboard or the like is shown in Figure 4. The spacer disc 23 has a diameter slightly less than the diameter of the circular opening 21. In forming the double sided page, a small spacer disc 23 is glued concentrically to a large disc 22. Two of these disc assemblies are placed back to back, that is large disc to large disc, and the two disc assemblies are then placed between the two sheets 20 as shown in Figure 5. When thus placed, the small spacer discs 23 are concentric with the circular openings 21. In this position the outer periphery of the large discs 22 are nearly tangent with the sides of the square sheets 20.

Figure 6:
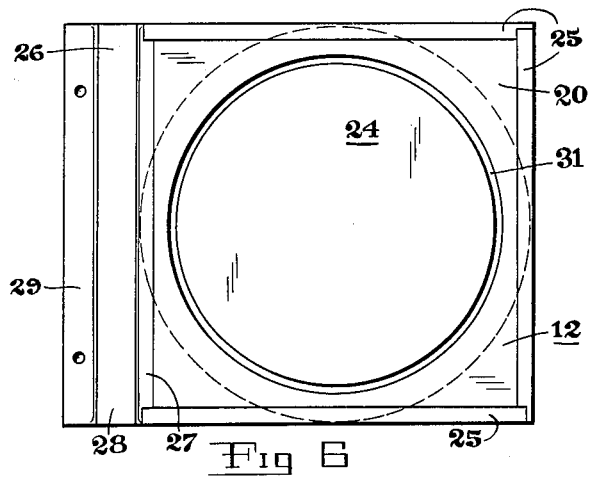
Figure 6 is a plan view of a double sided page and disc assembly.

The Figure 6 shows the two disc assemblies 24 positioned within the two sheets 20 and with the two sheets being bound together on three sides with narrow strips of tape 25. The tape extends from the face of one sheet 20 around the edge of the two sheets and onto the face of the other sheet 20. At the left edge of Figure 6 two wider strips of tape 26 have a narrow longitudinal portion 27 thereof secured to the face of the sheets 20. A middle longitudinal portion 28 of the tapes 26 are secured to each other. A spacer strip 29 of cardboard or the like is sandwiched between the remaining narrow longitudinal portion 30 of the tapes 26 and secured thereto. The tapes 26 change the square sheets 20 into a rectangular page 12 with this page 12 including two of the sheets 20. The middle longitudinal portion 28 of the tapes 26 provides a hinge portion of the page 12 so that when the spacer strip 29 is bound into the album 11 the various pages 12 may be turned relative to the album.

Figure 7:
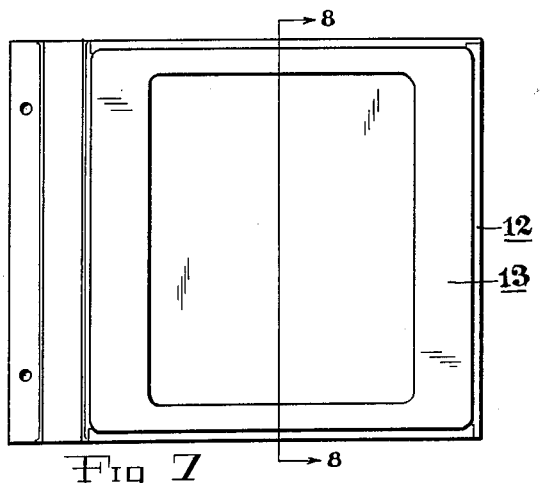
Figure 7 is a plan view of the page disc and photograph mount assembled.

The completed photograph mount 13 may next be adhesively secured to the small spacer discs 23 on each side of the page 12. The photograph mount 13 as fastened to one of the disc assemblies 24 will then be that shown in Figure 7. As shown in Figure 6, there is a small space 31 between the spacer disc 23 and the circular opening 21, and this small space 31 insures that the glue used in securing the photograph mount 13 to the spacer disc 23 will not bridge across to the sheet 20. Thus, the disc assembly 24 may be rotated relative to the page 12.

Figure 8:
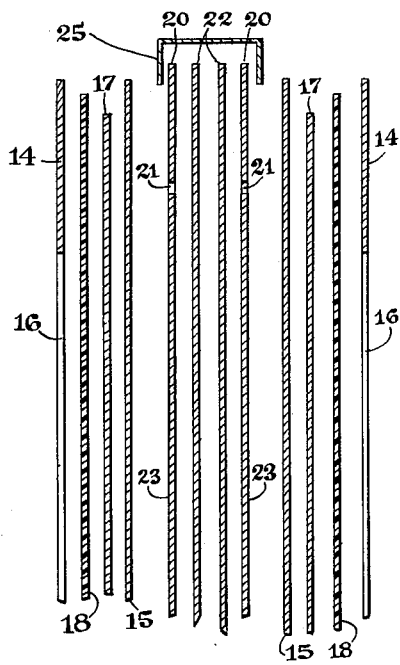
Figure 8 is a sectional view on the line 8—8 of Figure 7.

Figure 8 is an expanded sectional view along the center line of the completed double sided page 12. Starting at the left side of this figure, there is the square front cover 14 having the rectangular window opening 16 therein. Next is the transparent sheet 18 which is larger than the opening 16. Next is the photograph 17 or other sheet member to be displayed which preferably will be slightly larger than the window opening 16. Next is the square rear cover 15 which is glued along three edges to the front cover 14. The square rear cover 15 is glued to the small spacer disc 23. This spacer disc 23 is in turn glued to a large disc 22. The small spacer disc 23 lies substantially in the plane of the sheet 20 which has the circular opening 21 therein. The aforementioned cardboard elements thus comprise a complete page and interlocking photograph mount. In this preferred embodiment the pages are double sided; and hence, the various elements mentioned above are duplicated in the reverse order in progressing toward the right of Figure 8. The tape 25 joins together the edges of the two sheets 20 to form the page 12 with the two large discs 22 enclosed therein.

The rear cover 15, the spacer disc 23, and the large disc 22 when glued together form a composite structure which forms a groove, and the page 20 forms a tongue which extends into this groove. This tongue and groove connection, therefore, prevents movement of the photograph mount 13 in a direction normal to the page 12. Further, this tongue and groove connection, since it is circular, permits free relative rotation between the photograph mount 13 and the page 12. This rotation of the photograph mount 13 is illustrated in Figure 9 wherein the photograph mount is shown at an angle to the page 12 to illustrate that it may be rotated 90 degrees from a vertical position to a horizontal position. The photograph mount 13 may be rotated a full 360 degrees relative to the page 12, or positioned at any angle relative to the page 12; however, normally, in this preferred embodiment the photograph mount 13 would be positioned only at either the horizontal or the vertical position.

There are two sheets 20 bound together along the edges thereof for each double sided page in the album. Thus, the two sheets become first and second planar portions of the composite pages and are generally parallel. It will be noted that a tongue and groove or interlocking connection is effected in two different ways. The rear cover 15, spacer disc 23, and large disc 22 when glued together form a groove into which the sheet 20, as a tongue, is inserted. This is for a single sided application of the page of the album. In the double sided application of the page, as shown in the drawings, the two sheets 20 attached together by the tape 25, form a groove, into which the large disc 22, as a tongue, is inserted.

The front cover 14 and rear cover 15 have been described as being glued together at narrow edge portions; however, it will be understood that these covers may be secured together by narrow strips of tape such as the tapes 25. The entire album is generally assembled by the manufacturer and then the user of the photograph album may simply insert photographs into the pockets in the photograph mounts 13. The mounts 13 may then be rotated, if necessary, to position the photograph in the desired attitude. With this construction the photograph mounts are permanently attached to the album, and there is thus no danger that they may become lost or that they will become creased or defaced by the user removing and replacing the mounts.

The large discs 22 are practically the same size as the square sheets 20 and are hence confined by the tapes 25 and 26. Thus, the large discs 22 provide means for preventing transverse shifting of the photograph mount 13 relative to the page 12, yet permitting arcuate movement therebetween. The spacer discs 23 may also be that which prevents transverse shifting between the photograph mounts 13 and the page 12; however, in the preferred embodiment the space 31 is made large enough to prevent glue bridging across from the disc 23 to the page 20. And thus, the large disc 22 is that which maintains the photograph mount 13 in a central position.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A display device comprising, a first and a second sheet, a locking member having at least two arcuate portions and fixedly attached near the center thereof to said first sheet, said second sheet having first and second planar portions substantially parallel, said first and second planar portions being joined together at least along two edges of each sheet, said second planar portion having an opening of appreciable size yet smaller than said locking member, at least part of said second planar portion being disposed between said locking member and said first sheet to form a connection therebetween which is interlocking in a direction normal to said first sheet yet permits at least partial relative rotation of said first and second sheets substantially about the center of said locking member, said arcuate portions substantially touching said second sheet at the lines of junction of said first and second planar portions to limit the relative transverse shifting of said first and second sheets, and means to secure a display sheet to one of said first and second sheets.

2. A photograph mount comprising, a first and a second sheet, a disc fixedly attached at the center thereof to said first sheet, said second sheet having first and second planar portions substantially parallel, said first and second planar portions being joined together at least along two edges of each sheet, said second planar portion having an opening of appreciable size yet smaller than said disc, at least part of said second planar portion being disposed between said disc and said first sheet to form a connection therebetween which is interlocking in a direction normal to said disc yet permits free relative rotation of said disc and said second sheet substantially about the center of said disc, said disc subsantially touching said second sheet at the lines of junction of said first and second planar portions to limit the relative transverse shifting of said first and second sheets, and means to secure a photograph to one of said first and second sheets.

3. A display frame for a page having an opening therein, comprising, a cover, a disc fixedly secured to said cover through said opening and disposed on opposite sides of said page, both said disc and said cover being larger than said opening to thus form an interlocking connection between said page and the composite structure of disc and cover, said opening being nearly as large as said cover, said disc and cover cooperating with said page to permit relative movement of said composite structure and said page to two alternative positions generally mutually perpendicular, said disc and cover co-operating with said page to substantially limit transverse shifting of said composite structure relative to said page at least at said two alternative positions, and means on said cover to carry a sheet for display on the front thereof.

4. A display frame comprising, a page having an opening thereon, a rear cover, a disc fixedly secured to said rear cover at least at the center thereof and disposed on opposite sides of said page, both said disc and said rear cover being larger than said opening to thus form an interlocking connection between said page and the composite structure of disc and cover, said disc and cover co-operating with said page to permit relative movement of said composite structure and said page to two alternative positions generally mutually perpendicular, said disc and cover co-operating with said page to substantially limit transverse shifting of said composite structure relative to said page at least at said two alternative positions, and a front cover having a window opening therein and secured to said rear cover.

5. A display frame comprising, a page having an opening therein, a spacer, a disc fixedly secured to said spacer, a rear cover fixedly secured to said spacer with said spacer disposed in said opening, both said disc and said rear cover being larger than said opening to thus form an interlocking connection between said page and the composite structure of disc, spacer and cover, said disc and spacer co-operating with said page to permit two alternative positions generally mutually perpendicular of said composite structure relative to said page, one of said disc and spacer co-operating with said page to substantially limit transverse shifting of said composite structure relative to said page at least in said two alternative positions, and a front cover having a window opening therein and secured to said rear cover.

6. A display frame comprising, a sheet having a circular opening therein, a spacer, a disc fixedly secured to said spacer, a rear cover fixedly secured to said spacer with said spacer disposed in said circular opening, both said disc and said rear cover having a dimension longer than the diameter of said circular opening to thus form an interlocking connection between said sheet and the composite structure of disc, spacer and cover, one of said disc and spacer co-operating with said sheet to substantially limit transverse shifting of said composite structure relative to said sheet, said disc and spacer co-operating with said sheet to permit an arcuate movement of at least 90 degrees of said composite structure relative to said sheet, and a front cover having a window opening therein and fixedly secured to said rear cover.

7. A photograph mount comprising, a page, said page having an opening therein, a spacer, a disc fixedly secured to said spacer, a rear cover fixedly secured to said spacer with said spacer disposed in said opening, both said disc and said rear cover being larger than said opening to thus form an interlocking connection between said page and the composite structure of disc, spacer and cover, said disc co-operating with said page to substantially limit transverse shifting of said composite structure relative to said page, said disc co-operating with said page to permit an arcuate movement of at least 90 degrees of said composite structure relative to said page, and a front cover having a photograph window opening therein and fixedly secured to said rear cover.

8. A photograph mount comprising, a page for a photograph album, said page having a circular opening therein, a spacer disc, a rear disc fixedly secured to said spacer disc, a rear cover fixedly secured to said spacer disc with said spacer disc disposed in said circular opening, both said rear disc and said rear cover having a dimension longer than the diameter of said circular opening to thus form an interlocking connection between said page and the composite structure of discs and cover, one of said discs co-operating with said page to substantially limit transverse shifting of said composite structure relative to said page, said discs co-operating with said page to permit an arcuate movement of at least 90 degrees of said composite structure relative to said page, and a front cover having a photograph window opening therein and fixedly secured to said rear cover.

9. A display frame comprising, a sheet having a circular hole therein, a first large disc of cardboard disposed on a first side of said first sheet, said large disc being larger than said circular hole, a second small spacer disc of cardboard adhesively and co-axially secured to said first large disc and substantially fitting and co-axially located within the circular hole in said first sheet, a rear cover adhesively secured to said second small spacer disc, a front cover adhesively secured along three sides to said rear cover, said front and rear covers being in registry and of approximately the same size, and said front cover having a rectangular window opening therein to display a sheet member placed between said front and rear covers.

10. A photograph mount comprising, a square page for an album including first and second square sheets, said first sheet having a circular hole nearly as large as the length of said square first sheet, narrow strips of adhesive tape on three edges of said page extending from the face of the first sheet to the face of the second sheet around the edges of the sheets, two wider strips of adhesive tape each having a narrow longitudinal portion thereof adhering to the face of the sheets along the fourth side of the page, the remaining longitudinal portions of said wider strips of tape being substantially co-extensive and adhering to each other, a first large disc of cardboard disposed inside said page between said first and second sheets, said large disc being larger than said circular hole and having a diameter substantially equal to the length of said square page, a second small spacer disc of cardboard adhesively and co-axially secured to said first large disc and substantially co-axially located within the circular hole in said first sheet, a square rear cover slightly smaller than the square page and adhesively secured to said second small spacer disc, the center of said square rear cover being located substantially on said axis, a square front cover adhesively secured along three sides to said rear cover, said front and rear covers being in registry and of approximately the same size, said front cover having a rectangular window opening therein to view a photograph placed between said front and rear covers, and a transparent window between said front and rear covers larger than said window opening.

11. A photograph mount comprising, a square page for an album including first and second substantially identical square sheets, each of said sheets having a circular hole nearly as large as the length of said square sheets, narrow strips of adhesive tape on three edges of said page extending from the face of the first sheet to the face of the second sheet around the edges of the sheets, two wider strips of adhesive tape each having a narrow longitudinal portion thereof adhering to the face of the sheets along the fourth side of the page, the remaining longitudinal portions of said wider strips of tape being substantially co-extensive and adhering to each other, first and second large discs of cardboard disposed inside said page between said first and second sheets, said large discs being larger than said circular holes and each having a diameter substantially equal to the length of said square page, first and second small spacer discs of cardboard adhesively secured co-axial with said first and second large discs, respectively, and substantially co-axially located within the circular holes in said first and second sheets, respectively, first and second square rear covers slightly smaller than the square page and adhesively secured to said first and second small spacer discs, respectively, the centers of said square rear covers being located substantially on said axis, first and second square front covers adhesively secured along three sides to said first and second rear covers, respectively, said front and rear covers being in registry and of approximately the same size, each of said front covers having a rectangular window opening therein to view a photograph placed between said front and rear covers, and a transparent window between each pair of front and rear covers larger than said window opening.

12. A display frame comprising, a sheet having an opening therein, a spacer, a locking element fixedly secured to said spacer, a cover fixedly secured to said spacer with said spacer disposed in said opening, both said locking element and said cover having a dimension longer than the length of said opening to thus form an interlocking connection between said sheet and the composite structure of said locking element, spacer and cover, one of said locking elements and spacer co-operating with said sheet to substantially limit transverse shifting of said composite structure relative to said sheet, said locking element and spacer co-operating with said sheet to permit an arcuate movement of at least 90 degrees of said composite structure relative to said sheet, and means on said cover to carry a sheet for display on the front thereof.

References Cited in the file of this patent

UNITED STATES PATENTS

| | | |
|---|---|---|
| 617,645 | Drury | Jan. 10, 1899 |
| 648,835 | Biggs | May 1, 1900 |
| 2,045,822 | Banks | June 30, 1936 |
| 2,568,178 | Widder | Sept. 18, 1951 |
| 2,637,325 | McCabe | May 5, 1953 |